United States Patent [19]

Ando et al.

[11] 3,716,440
[45] Feb. 13, 1973

[54] METHOD OF MANUFACTURING A RESINOUS DECORATIVE LAMINATE HAVING A LUSTROUS PATTERN OF REALLY METALLIC SURFACE

[75] Inventors: Fumio Ando; Hideharu Kitahama; Kazuhiro Sugiyama, all of Gifu-ken, Japan

[73] Assignee: Ilrigawa Electric Industry Co., Ltd., Gifu-ken, Japan

[22] Filed: Dec. 29, 1970

[21] Appl. No.: 102,533

[30] Foreign Application Priority Data

Jan. 19, 1970 Japan ...................................45/4430

[52] U.S. Cl. ..................156/277, 156/278, 156/311, 156/312, 156/335, 161/264, 161/413
[51] Int. Cl..........................B32b 29/00, B32b 31/20
[58] Field of Search......156/277, 278, 282, 311, 312; 264/137; 117/13, 31, 14, 100 M

[56] References Cited

UNITED STATES PATENTS

| | | | |
|---|---|---|---|
| 3,418,189 | 12/1968 | Grosheim | 156/277 |
| 3,287,157 | 11/1966 | Brown et al. | 117/31 X |
| 3,373,068 | 12/1968 | Grosheim et al. | 156/277 X |
| 1,361,970 | 12/1920 | Dickey | 156/311 |
| 1,475,764 | 11/1923 | Frederick | 264/137 |
| 2,668,124 | 2/1954 | Mallabar | 156/277 X |
| 3,049,458 | 8/1962 | Willard | 156/278 X |
| 3,090,700 | 5/1963 | Ball et al. | 264/137 |
| 3,343,975 | 9/1967 | Daneski et al. | 156/277 |

FOREIGN PATENTS OR APPLICATIONS

| | | | |
|---|---|---|---|
| 221,187 | 11/1958 | Australia | 117/13 |
| 1,061,732 | 7/1959 | Germany | 117/13 |

*Primary Examiner*—Ralph Husack
*Attorney*—Kemon, Palmer & Estabrook

[57] ABSTRACT

A novel resinous decorative laminate having a surface look of really metallic luster, such as that of gold or silver, is made by hot-pressing an assembly of laminated materials which consists of a sheet of paper pattern impregnated therethrough with a thermosetting resin and having a pattern printed thereon by the use of a printing ink containing a metal powder and a resinous vehicle, and several basic layer materials impregnated with a thermosetting resin. There is no ordinary overlay paper used in forming the decorative laminate.

3 Claims, No Drawings

METHOD OF MANUFACTURING A RESINOUS DECORATIVE LAMINATE HAVING A LUSTROUS PATTERN OF REALLY METALLIC SURFACE

BACKGROUND OF THE INVENTION

This invention refers to a decorative laminate, and more particularly to a resinous decorative laminate having a lustrous pattern of really metallic look on the surface thereof.

It has been known to make a resinous decorative laminate having somewhat metal-like luster on the surface, and the process of manufacturing it was as follows. A paper pattern was prepared by, first, printing on a paper with an ink prepared by grinding the so-called gold dust, that is, a powder of brass metal or the so-called silver dust, that is, a powder of aluminum metal, in an appropriate amount of vehicle, and then impregnating the print with a thermosetting resin therethrough. Over this paper pattern was put an unfigured overlay paper which was also impregnated with the same thermosetting resin, and turned almost transparent upon hot-pressing. Further, several sheets of kraft paper impregnated with a thermosetting resin, such as phenolic resin, were piled on one another under this paper pattern. Finally, the above-mentioned resinous decorative laminate was obtained by the subsequent curing of the above-mentioned assembly of the laminated materials by means of hot-pressing.

Though the surface pattern of the decorative laminate made in the above-mentioned way had an appearance somewhat similar to metallic luster, it did not exhibit really golden or silvery luster.

Moreover, the conventional laminate of this type was poor in resistance to heating, say, to that by boiling water or a cigarette light. When the surface of this laminate was heated, the resinous overlay layer tended to be stripped off the metal layer part of the laminated body, thereby damaging the laminate very frequently.

SUMMARY OF THE INVENTION

An object of the present invention is to obtain a resinous decorative laminate having a lustrous pattern of really golden or silvery look on the surface thereof.

Another object of the present invention is to improve the physical properties of the surface layer of the resinous decorative laminate having a lustrous pattern of metallic look on the surface thereof.

These objects may be attained in accordance with this invention by using no unfigured overlay paper impregnated with a thermosetting resin in the aforementioned usual method for preparing a resinous decorative laminate having a lustrous pattern of somewhat golden or silvery look on the surface thereof.

DETAILED DESCRIPTION OF THE INVENTION

Further objects and advantages of the invention will be evident by referring to the following detailed description.

First, a thermosetting resin such as melamine-, urea-, benzoguanamine-, acetoguanamine-, or diacrylphthalate-resin, or alternatively such a thermoplastic resin as cellulose acetate, is used as an ink vehicle, in which is ground the so-called gold dust, that is, brass dust or the so-called silver dust, that is, aluminum dust for the preparation of a printing ink.

On the surface of transparent or opaque paper impregnated with such a thermosetting resin as melamine-, urea- or phenolic-resin is printed a pattern with the above-mentioned ink by screen-, gravure- or flexo-printing process. The print thus obtained is dried for the preparation of a paper pattern. This paper pattern answers the purpose all the same, no matter whether it has a special figure printed on it, or it is only printed solid all over the surface with no figure on it.

This paper pattern is put on the conventional laminated basic layer materials and the assembly thus formed is cured by the usual process of hot-pressing to obtain the novel laminate.

As is evident from the above description, the different point of the method in this invention from the various conventional methods of this type lies in that it does not use at all such an overlay paper as was used in the past. When a cured overlay exists on the surface of the laminate, it does not turn perfectly transparent. Moreover, it has been found by us that, among light reaching the metal powder fixed on the paper pattern of the laminate through the overlay and also light reflected from the metal powder, there is some light of certain wavelengths which is absorbed by the cured overlay, resulting in that the surface of the decorative laminate fails to exhibit really metallic luster, thereby diminishing its beauty.

In addition, the conventional cured overlay of the laminated body is poor in adhesion to the metal powder fixed on the paper pattern of the laminated body. When the surface of the laminate is heated by boiling water or a cigarette light, for instance, the cured overlay would have a defect of getting stripped off the patterned part of the laminated body quite easily.

As the resinous decorative laminate prepared by the process of this invention has no conventional cured overlay on the surface, it exhibits a surface look of really metallic luster. Furthermore, the heat conductivity of the metal powder fixed on the surface of the laminate is so high that no damage is caused on the surface of the laminate by boiling water or a cigarette light.

On the contrary, as the resinous decorative laminate prepared by the process of this invention has no cured overlay on the surface, the golden luster is often in danger of gradual discoloration. In such case, the use of brass dust subjected to the discoloration preventive treatment is quite effective. As the process to prevent the discoloration of copper or copper alloy, it is generally known to react these metals with a compound of thiazole, imidazole or benztriazole type, thereby forming a non-discoloring molecular film on the surface.

Further, as the resinous decorative laminate prepared by the process of this invention has no cured overlay on the surface, it has a tendency of becoming poor in abrasion resistance. To prevent this, it is effective to use unsized paper of high absorption as the paper to be printed so as to improve the penetration of printing ink thereinto, or to use a paper with patterns printed on both surfaces thereof which are perfectly registered with each other. Another useful process is to use two sheets of paper piled on each other which have the same patterns printed thereon. In this case, the same effect can be obtained as in the above-mentioned use of a sheet of paper with patterns printed on both sides thereof. The two printed papers may be prepared from the same kind of paper or different kind of paper from each other.

It is to be noticed that, in all cases, the printed pattern exists always on the outside surface of the laminating materials assembly.

When a plate having an adequate uneven figure on the inside surface which comes in contact with the surface of the laminating materials assembly is used as one of the pressing plates in hot-pressing, delicate changes are produced in the metallic luster of the surface depending upon the angles of the vision in the reflection of light from the surface of the laminated article and thus a more beautiful product can be obtained.

It does not matter what type of metal powder is used in the process of this invention. However, the so-called gold dust, that is, brass dust or the so-called silver dust, that is, aluminum dust gives the most beautiful effect and, moreover, is most economical.

EXAMPLES

The process of the present invention will be more fully understood by referring to the following specific examples.

EXAMPLE 1

To prepare a printing ink suitable for screen-printing, there were mixed six weight parts of the primary condensation product of melamine resin with four weight parts of the so-called gold dust, that is, brass dust treated with benztriazole, and an optimum amount of methyl alcohol and also an optimum amount of sodium alginate were added as the diluent and the viscosity increasing agent respectively to the mixture.

On many sheets of unsized paper impregnated with the primary condensation product of melamine resin was printed a pattern respectively with this ink by screen-printing process, and the papers were dried at 90° C for 3 minutes.

Seven sheets of kraft paper impregnated with the primary condensation product of phenolic resin having the specific gravity of .190g/m² were piled on one another, and one of the above-mentioned printed papers was put on the pile with the printed surface turned outside. This assembly was sandwiched between two pressing plain plates made of stainless steel, and hot-pressed for 20 minutes under the condition of temperature of 150° C and pressure of 90 Kg/cm². After cooling with cold water for 10 minutes, a beautiful cured decorative laminate with the surface having a figure which gives golden color true to nature was obtained.

EXAMPLE 2

To prepare a printing ink suitable for flexo-printing, there were mixed seven weight parts of the primary condensation product of benzoguanamine resin with three weight parts of the so-called silver dust, that is, actually aluminum dust, and an optimum amount of acetone and also an optimum amount of polyacrylate were added as the diluent and the viscosity increasing agent respectively to the mixture.

Each surface of many sheets of unsized paper impregnated with the primary condensation product of melamine resin, and of many other sheets of kraft paper (specific gravity; 190 g/m²) was printed solid uniformly all over with this ink by flexo-printing process, and then the papers were dried for 2 minutes at 90° C.

A sheet of the above-mentioned printed kraft paper was put on a sheet of plywood 3 mm thick with the printed surface turned outside, and a sheet of the above-mentioned printed paper was put further thereon with the printed surface turned outside. This assembly was sandwiched between two stainless pressing plates, one of which had a suitable uneven figure engraved on the inside surface thereof so as to come in contact with the said printed surface, and then the assembly was hot-pressed for 20 minutes under the condition of temperature of 140° C and pressure of 15 Kg/cm². After cooling with cold water for 10 minutes, there was obtained a beautiful cured decorative laminate whose whole surface had silvery color true to life and an uneven figure, giving delicate visional changes depending upon the different angles of the vision.

What we claim is:

1. A method of preparing a resinous decorative laminate having a surface presenting a lustrous metallic appearance which comprises:
    a. stacking together in a pile a plurality of fibrous sheets impregnated throughout with thermosetting resin selected from the group consisting of melamine resin, urea resin and phenolic resin,
    b. impregnating a paper throughout with thermosetting resin selected from the group consisting of melamine resin, urea resin and phenolic resin,
    c. printing a decorative pattern on the paper obtained from step "b" with ink made of a mixture of metal powder, an ink vehicle consisting of resin selected from the group consisting of melamine resin, urea resin, benzoguanamine resin, acetoguanamine resin, diacrylphthalate resin, and cellulose acetate resin, a diluent for said resin and a viscosity increasing agent,
    d. applying the printed paper from step "c" on the top of the pile of fibrous sheets from step "a" in such a manner that the printed surface forms the top surface of the resulting assembly,
    e. hot pressing and curing the assembly resulting from step "d," and
    f. cooling the cured laminate prepared in step "e."

2. The method according to claim 1 wherein the decorative pattern paper used in the step (d) is printed on both sides thereof with perfect registration of both surface patterns to each other.

3. A method of preparing a resinous decorative laminate having a durable surface presenting a lustrous metallic appearance without the use of an overlay sheet which comprises:
    a. stacking together in a pile a plurality of fibrous sheets impregnated throughout with thermosetting resin selected from the group consisting of melamine resin, urea resin and phenolic resin,
    b. impregnating a paper throughout with thermosetting resin selected from the group consisting of melamine resin, urea resin and phenolic resin, c. printing a decorative pattern on the paper obtained from step "b" with ink made of a mixture of metal powder, an ink vehicle consisting of resin selected from the group consisting of melamine resin, urea resin, benzoguanamine resin, acetoguanamine resin, diacrylphthalate resin, and cellulose acetate resin, a diluent for said resin and a viscosity increasing agent, d. applying two sheets of printed paper from step "c" on the top of the pile of sheets from step "a" so as to fully register the printed pattern of the uppermost sheet with the printed pattern of the other, and with the surface of the uppermost sheet bearing the printed pattern forming the top surface of the resulting assembly, e. hot pressing and curing the assembly resulting from step "d," and f. cooling the cured laminate prepared in step "e."

* * * * *